US012645024B2

(12) United States Patent
Zhang et al.

(10) Patent No.: US 12,645,024 B2
(45) Date of Patent: Jun. 2, 2026

(54) BACKLIGHT MODULE, DISPLAY MODULE AND DISPLAY DEVICE

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Qiang Zhang, Beijing (CN); Haifeng Xu, Beijing (CN); Hui Dong, Beijing (CN); Xiaojun Wu, Beijing (CN); Aixia Sang, Beijing (CN); Xiaochun Shi, Beijing (CN); Jinfeng Zhang, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 449 days.

(21) Appl. No.: 18/030,311

(22) PCT Filed: May 27, 2022

(86) PCT No.: PCT/CN2022/095608
§ 371 (c)(1),
(2) Date: Apr. 5, 2023

(87) PCT Pub. No.: WO2023/226006
PCT Pub. Date: Nov. 30, 2023

(65) Prior Publication Data
US 2024/0369757 A1 Nov. 7, 2024

(51) Int. Cl.
*F21V 8/00* (2006.01)
*G02F 1/13357* (2006.01)

(52) U.S. Cl.
CPC ......... *G02B 6/0088* (2013.01); *G02B 6/0091* (2013.01); *G02F 1/1336* (2013.01)

(58) Field of Classification Search
CPC .... G02B 6/0088; G02B 6/0091; G02F 1/1336
See application file for complete search history.

(56) References Cited

U.S. PATENT DOCUMENTS

| | | | | |
|---|---|---|---|---|
| 8,605,229 B2 * | 12/2013 | Park | ........................ | G09F 9/35 |
| | | | | 349/60 |
| 9,927,649 B2 * | 3/2018 | Chen | ................ | G02F 1/133615 |

(Continued)

FOREIGN PATENT DOCUMENTS

| | | |
|---|---|---|
| CN | 101017266 A | 8/2007 |
| CN | 202032388 U | 11/2011 |

(Continued)

OTHER PUBLICATIONS

Office Action dated Apr. 17, 2026, issued in counterpart CN Application No. 202280001494.8, with English translation. (12 pages).

*Primary Examiner* — Daniel Petkovsek
(74) *Attorney, Agent, or Firm* — WHDA, LLP

(57) ABSTRACT

This application relates to a backlight module, including a middle frame, a back plate, a light guide plate and an optical film. The back plate includes a base plate and a side plate, and in a light-exiting direction of the light guide plate, a distance between a top surface of the side plate and the base plate is less than or equal to a distance between a light-exiting surface of the light guide plate and the base plate. The middle frame includes a top wall and side wall, the top wall covers a portion of the optical film, the side wall is arranged at one side of the side plate away from the light guide plate, and the side wall has a first snap-fastener projecting in a direction close to the light guide plate and (Continued)

connected to the side plate. A display module and display device are further provided.

17 Claims, 4 Drawing Sheets

(56)                    References Cited

U.S. PATENT DOCUMENTS

| | | | |
|---|---|---|---|
| 2006/0028595 | A1 | 2/2006 | Huang et al. |
| 2008/0225203 | A1 | 9/2008 | Kim |
| 2023/0039801 | A1 | 2/2023 | Zhang et al. |

FOREIGN PATENT DOCUMENTS

| | | | | |
|---|---|---|---|---|
| CN | 204962437 | U | 1/2016 | |
| CN | 206684439 | U | 11/2017 | |
| CN | 207051624 | U | 2/2018 | |
| CN | 211123563 | U | 7/2020 | |
| CN | 111583785 | A * | 8/2020 | .............. G09F 9/00 |
| CN | 211554563 | U | 9/2020 | |
| CN | 112987402 | A | 6/2021 | |
| CN | 214122616 | U | 9/2021 | |
| CN | 214623241 | U | 11/2021 | |
| CN | 215181306 | U | 12/2021 | |
| CN | 216160947 | U | 4/2022 | |
| WO | WO-2016045147 | A1 * | 3/2016 | ....... G02F 1/133608 |

* cited by examiner

BACKLIGHT MODULE, DISPLAY MODULE AND DISPLAY DEVICE

This application is the U.S. national phase of PCT Application No. PCT/CN2022/095608 filed on May 27, 2022, the entire contents of which are hereby incorporated by reference.

TECHNICAL FIELD

The present disclosure relates to the technical field of manufacturing display products, and more particularly to a backlight module, a display module and a display device.

BACKGROUND

With the development of technology and the improvement of appearance demand from consumers, the liquid crystal module with an ultra-narrow frame has become a trend, and the demand of consumers for the narrow frame is more and more intense.

SUMMARY

In order to solve the above-mentioned technical problem, the present disclosure provides a backlight module, a display module and a display device, which solve the problem of a limited narrow frame.

In order to achieve the above objective, embodiments of the present disclosure adopt the following technical solutions: a backlight module, including a middle frame, a back plate, a light guide plate, and an optical film.

The back plate includes a base plate and a side plate, and in a light-exiting direction of the light guide plate, a distance between a top surface of the side plate and the base plate is less than or equal to a distance between a light-exiting surface of the light guide plate and the base plate; the middle frame includes a top wall and a side wall, the top wall covers a portion of the optical film, the side wall is arranged at a side of the side plate away from the light guide plate, and the side wall has a first snap-fastener that projects towards a direction close to the light guide plate and is connected to the side plate.

Optionally, in the light-exiting direction of the light guide plate, a distance between the first snap-fastener and the top wall is greater than or equal to a thickness of the optical film.

Optionally, in a first direction perpendicular to the light-exiting direction of the light guide plate, a distance between the optical film and the side wall is greater than or equal to 0.002*L, L being a length of the optical film in the first direction.

Optionally, the first snap-fastener includes a connection surface connected with a top surface of the side plate, and a width of the connection surface in a direction perpendicular to the light-exiting direction of the light guide plate is greater than or equal to 0.5 mm.

Optionally, the first snap-fastener is formed by a portion of the side wall being recessed towards a direction close to the light guide plate, and includes a first portion connected to the side plate and a second portion connected between the side wall and the first portion, the first portion is arranged in parallel with the side plate, and an end surface of the first portion away from the second portion is the connection surface.

Optionally, a side surface of the first portion away from the light guide plate is aligned with a side surface of the side plate away from the light guide plate.

Optionally, an angle between the second portion and the side wall is greater than or equal to 90 degrees.

Optionally, a plurality of first snap-fasteners are spaced apart on the side wall along an extension direction of the side wall.

Optionally, the middle frame includes four side walls, the four side walls include a first side wall corresponding to a binding side of a display surface, and the first snap-fastener is provided on three side walls except the first side wall.

Optionally, the back plate is provided with a second snap-fastener projecting towards a direction away from the light guide plate, and the side wall is provided with a first snap-hole fitting with the second snap-fastener.

Optionally, an end of the side wall close to the top wall includes a first region, and the first region is folded towards a direction away from the side plate to a side of the top wall away from the side plate to form a support part, such that the first region forms the first snap-hole.

Optionally, a plurality of the first snap-holes are spaced apart on the side wall along an extension direction of the side wall, and at least one of the first snap-fasteners is provided between two adjacent first snap-holes.

Embodiments of the present disclosure further provide a display module, including: a display panel, and the above backlight module, where the middle frame and the display panel are fixed together by a foam, and both sides of the foam is provided with an adhesive layer.

Embodiments of the present disclosure further provide a display module, including: a display panel, the above backlight module, and a front frame, where a foam with an adhesive layer on one side is provided between the display panel and the middle frame, the adhesive layer is provided between the foam and the middle frame, and the front frame and the display panel are fixed through the adhesive layer.

Optionally, the front frame is provided with a second snap-hole, and the side wall of the middle frame is provided with a third snap-fastener that projects towards a direction away from the light guide plate and fits with the second snap-hole.

Optionally, the third snap-fastener is formed by a portion of the side wall being recessed towards a direction away from the light guide plate, and includes a third portion connected to the side wall and a fourth portion connected to the third portion, the fourth portion is arranged in parallel with a side plate of the front frame, and the fourth portion is accommodated in the second snap-hole.

Optionally, a side surface of the fourth portion away from the light guide plate is aligned with a side surface of the side plate of the front frame away from the light guide plate.

Optionally, a plurality of third snap-fastener are spaced apart on the side wall along an extension direction of the side wall, and at least one of the first snap-fasteners is provided between two adjacent of the third snap-fasteners.

Embodiments of the present disclosure also provide a display device including the above-described display module.

Advantageous effects of the present disclosure are: the height of the side plate of the back plate is reduced, so that the side plate of the back plate is located below the optical film, and a first snap-fastener is provided on the side wall of the middle frame to contact and fit with the side plate of the back plate. Thus, the limitation to the pre-expansion space of the optical film caused by the wall thickness of the back plate is released, and the expansion limited boundary is transferred from the inner side of the back plate to the inner side of the middle frame, so that the width of the frame can be greatly reduced.

DETAILED DESCRIPTION

Figure 1:
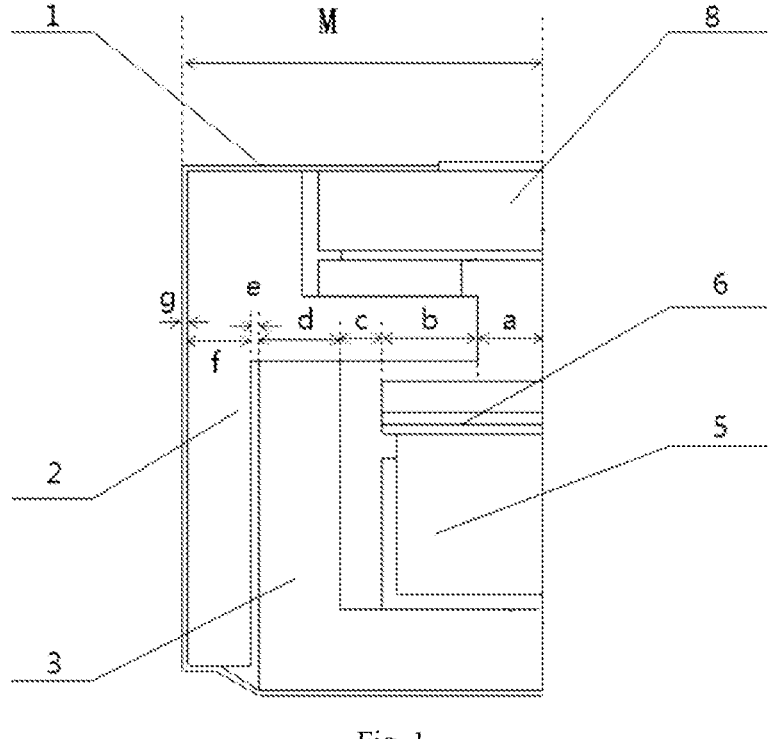
FIG. 1 is a structural diagram of a display module in the related art.

In order make the objective, technical solutions and advantages of embodiments of the present disclosure become more apparent, the embodiments of the present disclosure will be described clearly and completely with reference to the appended drawings. Obviously, the described embodiments are part, but not all, of embodiments of the present disclosure. Based on the embodiments of the present disclosure as described, all other embodiments available to one of ordinary skill in the art shall fall within the protection scope of the present disclosure.

In describing the present disclosure, it should be noted that such terms as "central", "upper", "lower", "left", "right", "vertical", "horizontal", "inner", "outer" indicate orientations or positional relationships based on the orientations or positional relationships shown in the drawings, merely to facilitate description of the present disclosure and simplify the description, and do not indicate or imply that the referenced devices or elements must have a particular orientation, be constructed and operated in a particular orientation, and thus should not be construed as limiting the present disclosure. Furthermore, such terms as "first", "second", and "third" are used for descriptive purposes only and are not to be construed as indicating or implying relative importance.

FIG. 1 is a schematic diagram of a cell tape module. The cell tape module includes a backlight module, a display panel 8 and an adhesive tape for connecting the backlight module and the display panel 8 together. The backlight module includes a back plate 3, a middle frame 2, a light guide plate 5 fixed onto the back plate 3, an optical film 6 disposed at a light-emitting side of the light guide plate 5. A width of the frame is M=a+b+c+d+e+f+g, where a represents a distance from the middle frame 2 to an AA area, which needs to ensure that the user cannot see the edge of the middle frame 2, is generally set a ≥0.8 mm.

b represents a length of an overlapping part between the middle frame 2 and the optical film 6, which needs to ensure that the optical film 6 does not jump out of the middle frame 2 after shrinking to avoid the risk of light leakage. In general, for a product less than 12.3 inches, b≥1.2 mm; for the products greater than 12.3 inches, b≥1.5 mm.

c represents a distance from the optical film 6 to the back plate 3, which needs to ensure that the optical film 6 has a sufficient expansion space at a high temperature. It is generally set that c>the total length L*expansion coefficient/2 of the optical film 6 (the expansion coefficient of the optical film 6 is generally selected as 0.4%, and the expansion coefficient of LGP is generally selected as 0.3%).

d represents a thickness of the back plate 3 (the thickness of a side plate 32). For a product with a size of below 10 inches, d=0.8 mm may be selected; for a product with a size within 10-13 inches, d=0.8 mm~1 mm may be selected; for a product with a size of above 15 inches, d=1.2 mm may be selected.

e represents a distance from the back plate 3 to a rubber frame: general setting e=0.1 mm.

f represents the thickness of a side wall 202 of the middle frame 2 is generally set to f=0.7 mm-1 mm.

g represents a thickness of the cell tape, and the cell tape is made of a common material, g=0.06 mm.

A limit border width M=0.7+b+(L*0.004/2)+d+0.1+0.7+0.06=1.56+b+d+0.002.

If a product has a size of 10.25 inches, b is 1.2 mm, the length L of the optical film 6 is 250 mm, the value of d is 0.8 mm, and the limit width of the frame is M=4.16 mm.

For a product has a size of 12.3 inches, b is 1.2 mm, the length L of the optical film 6 is 300 mm, the value of d is 0.8 mm, and the limit width of the frame is M=4.26 mm.

Figure 2:
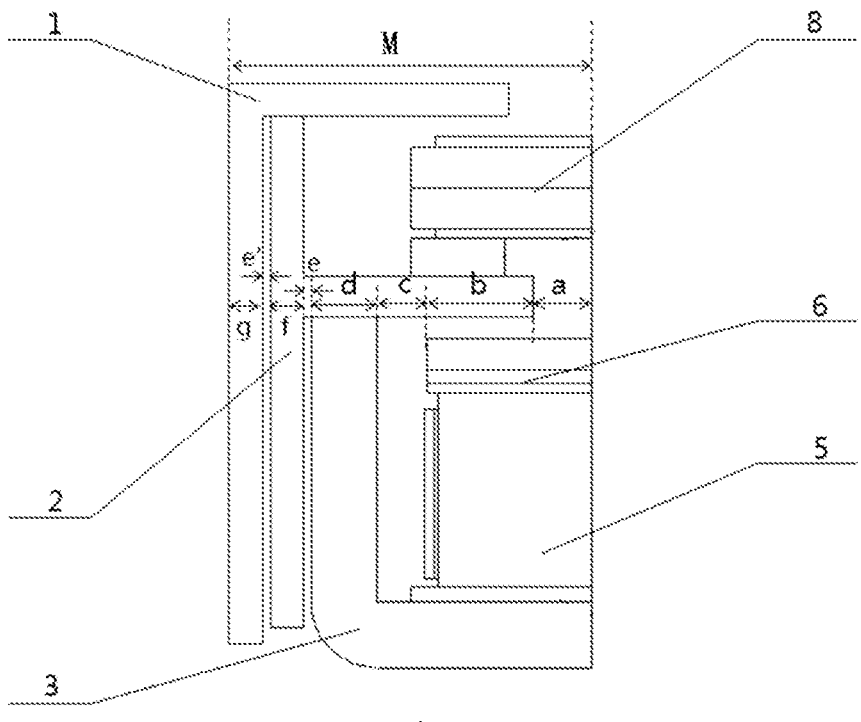
FIG. 2 is a structural diagram of a display module in the related art.

FIG. 2 is a structural diagram of a display module including a front frame 1. The display module includes a backlight module, a display panel 8 and the front frame 1 configured to connect the backlight module and the display panel 8 together. The backlight module includes a back plate 3, a middle frame 2, a light guide plate 5 fixed onto the back plate 3, an optical film 6 disposed at a light-emitting side of the light guide plate 5, and a width of the frame is M=a+b+c+d+e+f+e'+g.

a represents a distance from the middle frame 2 to the AA area, which needs to ensure that the user cannot see the edges of the middle frame 2, and is generally set as a ≥0.8 mm.

b represents a length of an overlapping part between the middle frame 2 and the optical film 6, which is required to ensure that the optical film 6 does not jump out of the middle frame 2 after shrinking, so as to avoid the risk of light leakage. Generally, for a product less than 12.3 inches, b≥1.2 mm; for the products greater than 12.3 inches, b≥1.5 mm.

c represents a distance from the optical film 6 to the back plate 3, which needs to ensure that the optical film 6 has a sufficient expansion space at a high temperature. It is generally set that c>the total length L*expansion coefficient/2 of the optical film 6 (the expansion coefficient of the optical film 6 is generally selected as 0.4%, and the expansion coefficient of LGP is generally selected as 0.3%).

d represents a thickness of the side plate 32 of the back plate 3. For a product with a size of below 10 inches, d=0.8 mm may be selected; for a product with a size within 10-13 inches, d=0.8 mm~1 mm may be selected; for a product with a size of above 15 inches, d=1.2 mm may be selected.

e represents a distance from the back plate 3 to a rubber frame: general setting e=0.1 mm.

f represents a thickness of a side wall 202 of the middle frame 2. For a product with a size of below 10 inches, f=0.3 mm may be selected; for a product with a size within 10 to 13 inches, f=0.3 mm to 0.4 mm may be selected; for a product with a size of above 13 inches, f=0.5 mm may be selected.

e' represents a distance between the middle frame 2 and the front frame 1, which is typically set as e'=0.1 mm.

g represents a thickness of the front frame 1. G=0.3 mm may be selected for products having a size below 10 inches, g=0.4 mm may be selected for products having a size within 10 to 13 inches, and g=0.5 mm may be selected for products having a size above 13 inches.

The width of the frame is M=0.8+b+(L*0.004/2)+d+0.1+0.3+0.1+0.4=1.5+b+d+0.002 L.

If a product has a size of 10.25 inches, b is 1.2 mm, the length L of the optical film 6 is 250 mm, the value of d is 0.8 mm, and the width of the frame is M=4.2 mm.

For a product has a size of 12.3 inches, b is 1.2 mm, the length L of the optical film 6 is 300 mm, the value of d is 0.8 mm, and the width of the frame is M=4.3 mm.

It can be seen from the structures in FIG. 1 and FIG. 2 that limited to the thickness of the back plate 3 and the length of the overlapping part between the middle frame 2 and the optical film 6, the frame of the module cannot be reduced to less than 4 mm, no matter what kind of module structure is used. Therefore, how to further make the frame of the module thinner and have mass production is a technical problem that needs to be solved presently.

With reference to FIG. 3 to FIG. 7, in view of the above-mentioned technical problems, an embodiment provides a backlight module, including a middle frame 2, a back plate 3, a light guide plate 5, and an optical film 6.

The back plate 3 includes a base plate 31 and a side plate 32, and in a light-exiting direction (referring to the Z direction in FIG. 3) of the light guide plate 5, a distance between a top surface of the side plate 32 and the base plate 31 is less than or equal to a distance between a light-exiting surface of the light guide plate 5 and the base plate 31.

The middle frame 2 includes a top wall 201 and a side wall 202, where the top wall 201 covers a portion of the optical film 6, the side wall 202 is disposed at a side of the side plate 32 away from the light guide plate 5, and the side wall 202 has a first snap-fastener 21, which projects in a direction close to the light guide plate 5, and is connected to the side plate 32.

With the above-mentioned solution, it is ensured that the side plate 32 of the back plate 3 can contact and fit with the first snap-fastener 21 of the middle frame 2, and it is also ensured that the optical film 6 is not interfered by the back plate 3 after expanding in the horizontal direction. Compared with the structures in FIG. 1 and FIG. 2, the backlight module in the embodiments relieves the limitation of the pre-expansion space of the optical film 6 due to the wall thickness of the back plate 3, and the expansion-limited boundary is transferred from the inner side of the side plate 32 of the back plate 3 to the inner side of the side wall 202 of the middle frame 2, so that the width of the frame can be greatly reduced. Taking the 12.3-inch product as an example, the width of the frame can be reduced by more than 0.9 mm (the thickness of the back plate 3 meets d≥0.8 mm) as compared to the existing products, which meets the customer's demand for the ultra-narrow frame module, is feasible in mass production, and ultimately increases the competitiveness of products.

Figure 3:
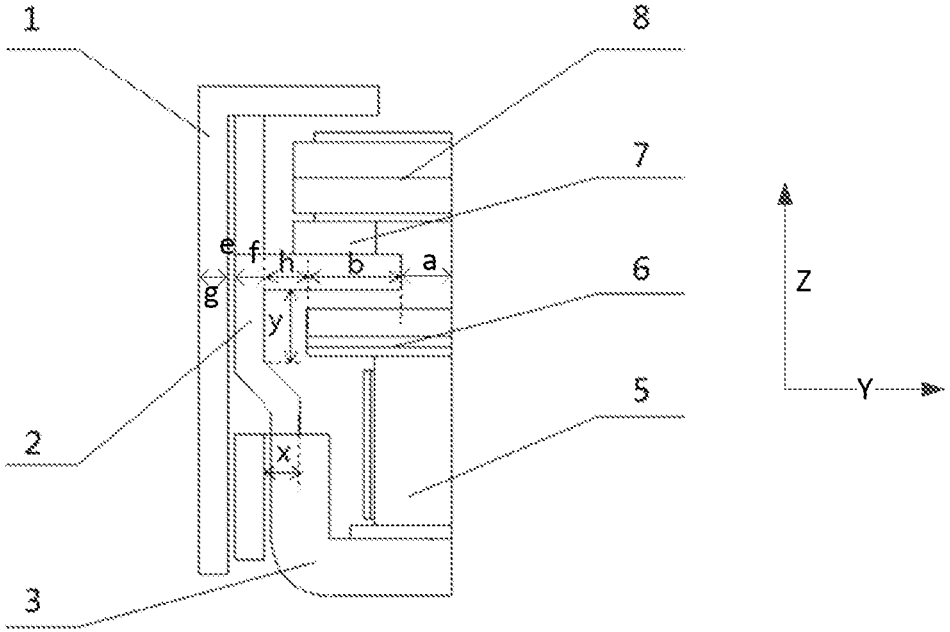
FIG. 3 is a structural diagram of a display device according to a first embodiment of the present disclosure.

Referring to FIG. 3, the width of the frame is equal to a+b+h+f+e+g=a+b+0.002 L+f+0.1+g=a+b+0.002 L+f+g+0.1 mm, where the value of h may refer to the value of c in FIG. 1 and FIG. 2, a is the distance between the middle frame 2 and the region AA, b is the length of the overlapping portion of the middle frame 2 and the optical film 6, f is the thickness of the middle frame 2, e is the gap between the middle frame 2 and the front frame 1, and g is the thickness of the front frame 1.

For a 10.25-inch product, the width of the frame is equal to 0.8+1.2+0.5+0.3+0.4+0.1=3.3 mm.

For a 12.3-inch product, the width of the frame is equal to 0.8+1.2+0.6+0.3+0.4+0.1=3.4 mm.

With the backlight module in this embodiment, a width of a frame of a product can be reduced to less than 4 mm: the frame of this structure is calculated to avoid the thickness d of the back plate 3 and the gap e, considering that the thickness of the back plate 3 is generally d≥0.8 mm, so that the frame can be reduced by more than 0.9 mm on the original basis.

Illustratively, in the light-exiting direction of the light guide plate 5, the distance y between the first snap-fastener 21 and the top wall 201 is greater than or equal to the thickness of the optical film 6.

Preferably, in the light-exiting direction of the light guide plate 5, the distance between the first snap-fastener 21 and the top wall 201 is greater than the thickness of the optical film 6, ensuring that the first snap-fastener 21 does not interfere with the optical film 6 after being expanded, and ensuring that the back plate 3 does not interfere with the expanded optical film 6.

Illustratively, in a first direction perpendicular to the light-exiting direction of the light guide plate 5, the distance h between the optical film 6 and the side wall 202 is greater than or equal to 0.002*L, where L is the length of the optical film 6 in the first direction.

In an embodiment, in a first direction (referring to the Y-direction in FIG. 3) perpendicular to the light-exiting direction of the light guide plate 5, the distance h between the optical film 6 and the side wall 202 is larger than 0.002*L, ensuring sufficient expansion space of the optical film 6 at high temperatures.

Illustratively, the first snap-fastener 21 includes a connection surface connecting with a top surface of the side plate 32, and a width x of the connection surface in a direction perpendicular to the light-exiting direction of the light guide plate 5 is greater than or equal to 0.5 mm.

With the above-mentioned solution, the connection area between the first snap-fastener 21 and the back plate 3 is ensured, and the support strength between the back plate 3 and the middle frame 2 is ensured.

Figure 5:
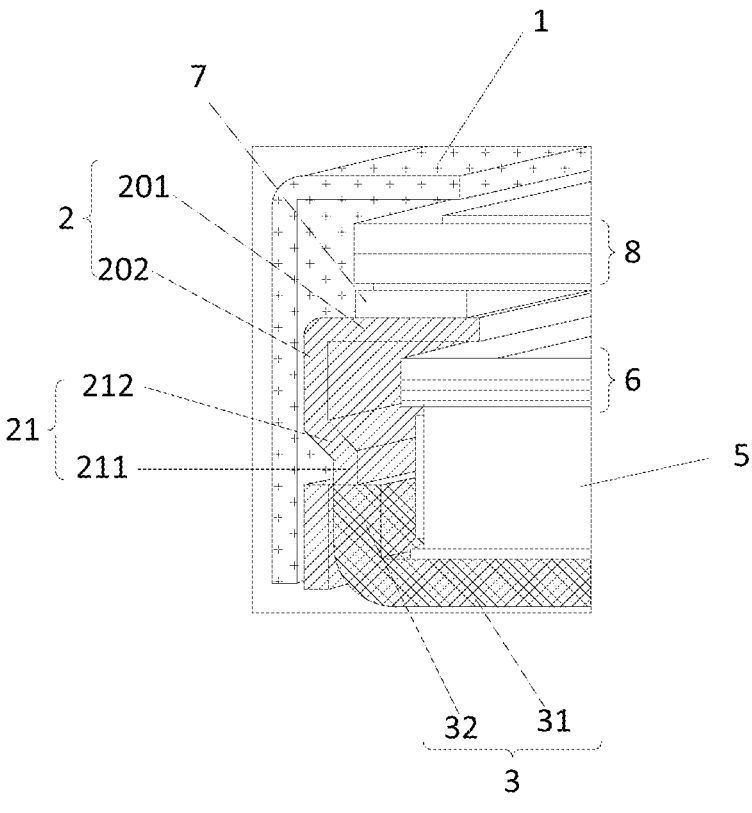
FIG. 5 is a structural diagram of a display device according to a second embodiment of the present disclosure.

Illustratively, the first snap-fastener 21 is formed by a portion of the side wall 202 being recessed towards a direction near the light guide plate 5, and includes a first portion 211 connected to the side plate 32 and a second portion 212 connected between the side wall 202 and the first portion 211, the first portion 211 is arranged in parallel with the side plate 32, and an end surface of the first portion 211 away from the second portion 212 is the connection surface, with reference to FIG. 5.

It should be understood that the specific configuration of the first snap-fastener 21 is not limited to the above embodiment, for example, the first snap-fastener 21 may be a raised plate attached to one side of the side wall 202.

Illustratively, a side surface of the first portion 211 away from the light guide plate 5 is parallel and aligned with a side surface of the side plate 32 away from the light guide plate 5.

It should be noted that the side surface of the first portion 211 away from the light guide plate 5 and the side surface of the side plate 32 away from the light guide plate 5 may be not aligned, for example, the side surface of the first portion 211 away from the light guide plate 5 may be exposed at the end surface of the side plate 32, or may be located inside the end surface of the side plate 32, and the specific arrangement mode may be set according to actual needs.

Illustratively, an angle between the second portion 212 and the side wall 202 is greater than or equal to 90 degrees.

In an embodiment, the angle between the second portion 212 and the side wall 202 is, but not limited to, 135 degrees.

Illustratively, a plurality of the first snap-fasteners 21 are spaced apart on the side wall 202 in an extension direction of the side wall 202.

The multiple first snap-fasteners 21 are uniformly provided on the side wall 202, ensuring the uniformity of the force applied to the side wall 202.

Illustratively, the middle frame 2 includes four side walls 202, the four side walls 202 include a first side wall 202 corresponding to a binding side of a display surface, and three side walls 202 other than the first side wall 202 are provided with the first snap-fastener 21.

With regard to a binding side, since the arrangement of a circuit board and the like, and the arrangement of a frame is limited, for example, a side-entry backlight module, one side of the light guide plate 5 corresponding to the first side wall 202 is provided with a light bar, the arrangement of the light bar requires space, and the back plate 3 cannot be retracted. Therefore, in the embodiments, three side walls 202 except the first side wall 202 are provided with the first snap-fastener 21.

Figure 4:
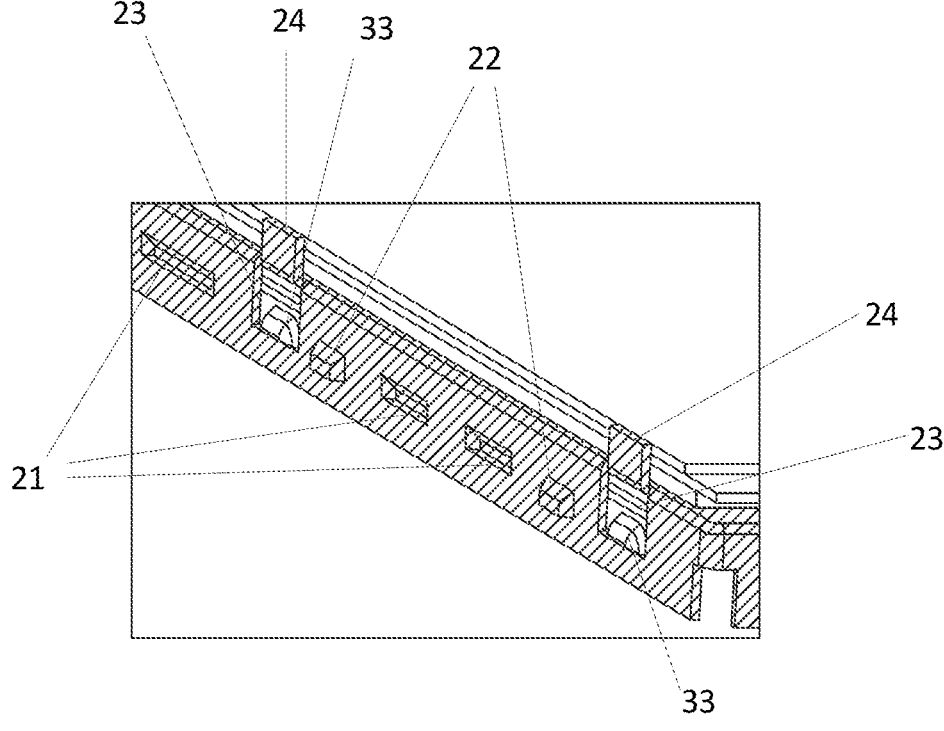
FIG. 4 is a structural diagram of a backlight module according to an embodiment of the present disclosure.

Illustratively, the back plate 3 is provided with a second snap-fastener 33 projecting towards a direction away from the light guide plate 5, and the side wall 202 is provided with a first snap-hole 23 fitting with the second snap-fastener 33, as shown in FIG. 4.

In order to ensure the stability of the connection between the middle frame 2 and the back plate 3, the second snap-fastener 33 and the first snap-hole 23 are used to fit with each other so as to enable the first snap-fastener 21 and the side plate 32 to be cooperated, and the two connection ways together achieve the connection between the middle frame 2 and the back plate 3.

Illustratively, an end of the side wall 202 close to the top wall 201 includes a first region that is folded in a direction away from the side plate 32 to one side of the top wall 201 away from the side plate 32 to form a support part 24, such that the first region forms the first snap-hole 2, see FIG. 4.

The support part 24 is formed to support the front frame 1 while forming the first snap-hole 23 to prevent the front frame 1 from pressing the display panel 8.

Illustratively, a plurality of the first snap-holes 23 are arranged at intervals on the side wall 202 in the extension direction of the side wall 202, and at least one the first snap-fastener 21 is provided between two adjacent first snap-holes 23.

The number of the first snap-fasteners 21 and the number of the first snap-holes 23 can both be set according to actual needs, and the first snap-fasteners 21 and the first snap-holes 23 are uniformly provided on the side wall 202, so that the overall force on the side wall 202 is uniform.

Embodiments of the present disclosure also provide a display module, including a display panel 8, and the above-mentioned backlight module. The middle frame 2 and the display panel 8 are fixed together via a foam 7, both sides of which are provided with an adhesive layer.

In the embodiments, the front frame 1 does not need to be provided, the display panel 8 and the middle frame 2 are fixed together via the foam 7 provided with an adhesive layer on both sides, and in this case, the side wall 202 of the middle frame 2 does not need to be provided with a buckle connected to the front frame 1.

An embodiment of the present disclosure also provides a display module, including a display panel 8, the above-mentioned backlight module, and a front frame 1, where a foam 7 provided with an adhesive layer on one side is provided between the display panel 8 and the middle frame 2, an adhesive layer is provided between the foam 7 and the middle frame 2, and the front frame 1 and the display panel 8 are fixed through the adhesive layer.

The foam 7 between the middle frame 2 and the display panel 8 plays a buffering role and is not fixed with the display panel 8, and the display panel 8 and the front frame 1 are fixed by an adhesive layer or by the foam 7 provided with a double-sided adhesive layer.

Figure 6:
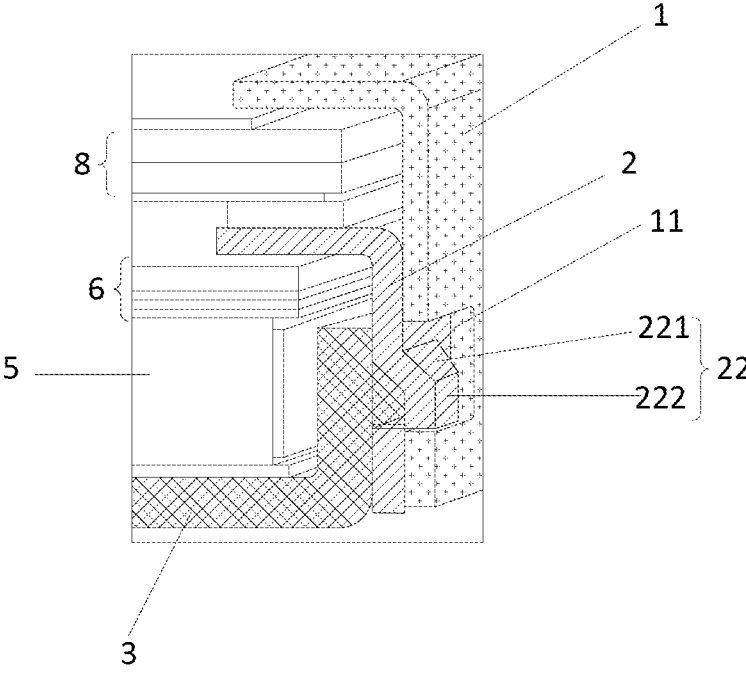
FIG. 6 is a structural diagram of a display device according to a third embodiment of the present disclosure.
Figure 7:
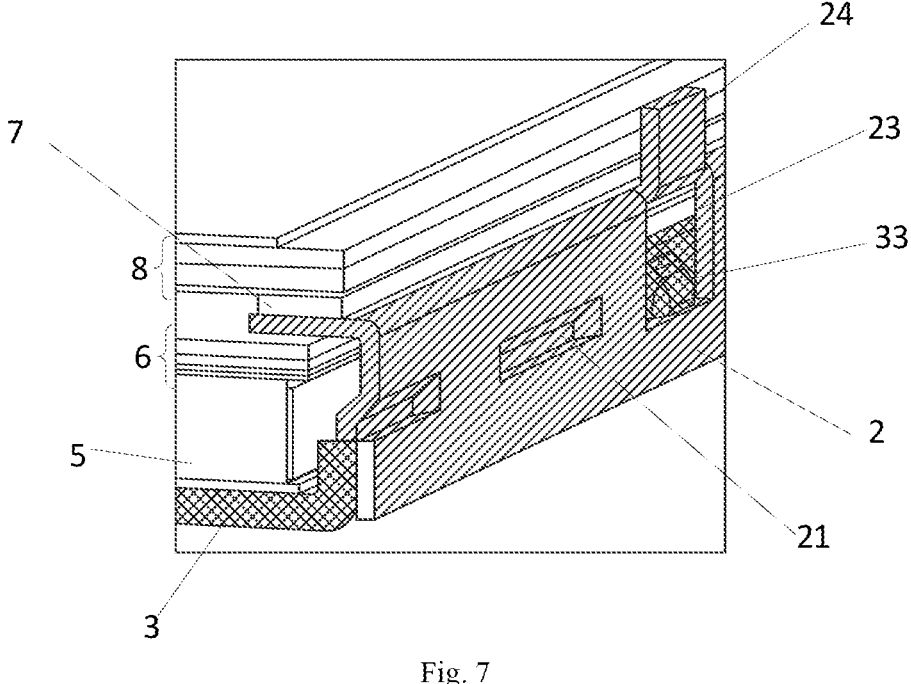
FIG. 7 is a structural diagram of a display device according to a fourth embodiment of the present disclosure.

Illustratively, the front frame 1 is provided with a second snap-hole 11, and the side wall 202 of the middle frame 2 is provided with a third snap-fastener 22 projecting towards a direction away from the light guide plate 5, so as to cooperate with the second snap-hole 11, with reference to FIG. 6.

Illustratively, the third snap-fastener 22 is formed by a portion of the side wall 202 being recessed in a direction away from the light guide plate 5, and includes a third portion 221 connected to the side wall 202 and a fourth portion 222 connected to the third portion 221, the fourth portion 222 is arranged in parallel with the side plate 32 of the front frame 1, the fourth portion 222 is accommodated in the second snap-hole 11.

It will be appreciated that the configuration of the third snap-fastener 22 is not limited to the above-described embodiments. For example, a bump attached to the side of the side wall 202 away from the side plate 32 may be used.

Illustratively, the side surface of the fourth portion 222 away from the light guide plate 5 is parallel and aligned with the side surface of the side plate 32 of the front frame 1 away from the light guide plate 5.

In a case that the thickness of the front frame 1 is the same as the thickness of the middle frame 2, in the light-exiting direction of the light guide plate 5, an orthographic projection of the fourth portion 222 onto the second snap-hole 11 completely coincides with the side wall 202 of the second snap-hole 11, but this is not limiting.

Illustratively, a plurality of the third snap-fasteners 22 are spaced apart on the side wall 202 in the extension direction of the side wall 202, and at least one of the first snap-fasteners 21 is arranged between two adjacent third snap-fasteners 22.

In an embodiment, the side wall 202 is provided with the first snap-fastener 21, the first snap-hole 23 and the third snap-fastener 22, and along the extension direction of the side wall 202, the first snap-fastener 21, the first snap-hole 23 and the third snap-fastener 22 are uniformly distributed to ensure the uniformity of the force exerted on the side wall 202, and a plurality of third snap-fasteners 22 are uniformly distributed to ensure the uniformity of the force exerted on the front frame 1.

Embodiments of the present disclosure also provide a display device including the above-described display module.

The display device may be: any product or component with a display function, such as a liquid crystal television, a liquid crystal display, a digital photo frame, a mobile phone, a tablet computer, where the display device further includes a flexible printed circuit, a printed circuit board and a back plate 3.

It is to be understood that the above-described embodiments are merely exemplary embodiments that have been employed to illustrate the principles of the present disclosure, and that the disclosure is not limited thereto. It will be apparent to those skilled in the art that various variations and improvements can be made in the present disclosure without departing from the spirit or scope of the disclosure, and these variations and improvements shall fall within the protection scope of this disclosure.

What is claimed is:

1. A backlight module, comprising: a middle frame, a back plate, a light guide plate and an optical film, wherein the back plate comprises a base plate and a side plate, and in a light-exiting direction of the light guide plate, a distance between a top surface of the side plate and the base plate is less than or equal to a distance between a light-exiting surface of the light guide plate and the base plate, the middle frame comprises a top wall and a side wall, the top wall covers a portion of the optical film, the side wall is arranged at a side of the side plate away from the light guide plate, and the side wall has a first snap-fastener that projects in a direction toward the light guide plate and is connected to the side plate, the back plate is provided with a second snap-fastener projecting in a direction away from the light guide plate, and the side wall is provided with a first snap-hole fitting with the second snap-fastener, and an end of the side wall toward to the top wall comprises a first region, and the first region is folded towards a direction away from the side plate to a side of the top wall away from the side plate to form a support part, such that the first region forms the first snap-hole.

2. The backlight module according to claim 1, wherein in the light-exiting direction of the light guide plate, a distance between the first snap-fastener and the top wall is greater than or equal to a thickness of the optical film.

3. The backlight module according to claim 1, wherein in a first direction perpendicular to the light-exiting direction of the light guide plate, a distance between the optical film and the side wall is greater than or equal to $0.002*L$, L being a length of the optical film in the first direction.

4. The backlight module according to claim 1, wherein the first snap-fastener comprises a connection surface connected with a top surface of the side plate, and a width of the connection surface in a direction perpendicular to the light-exiting direction of the light guide plate is greater than or equal to 0.5 mm.

5. The backlight module according to claim 4, wherein the first snap-fastener is formed by a portion of the side wall being recessed in a direction toward the light guide plate, and comprises a first portion connected to the side plate and a second portion connected between the side wall and the first portion, the first portion is arranged in parallel with the side plate, and an end surface of the first portion away from the second portion is the connection surface.

6. The backlight module according to claim 5, wherein a side surface of the first portion away from the light guide plate is aligned with a side surface of the side plate away from the light guide plate.

7. The backlight module according to claim 5, wherein an angle between the second portion and the side wall is greater than or equal to 90 degrees.

8. The backlight module according to claim 1, wherein a plurality of first snap-fasteners are spaced apart on the side wall along an extension direction of the side wall.

9. The backlight module according to claim 1, wherein the middle frame comprises four side walls, the four side walls comprise a first side wall corresponding to a binding side of a display surface, and the first snap-fastener is provided on three side walls other than the first side wall.

10. The backlight module according to claim 1, wherein a plurality of the first snap-holes are spaced apart on the side wall along an extension direction of the side wall, and at least one of the first snap-fasteners is provided between two adjacent first snap-holes.

11. A display module, comprising: a display panel, and the backlight module according to claim 1, wherein the middle frame and the display panel are fixed together by a foam, and both sides of the foam is provided with an adhesive layer.

12. A display device, comprising the display module according to claim 11.

13. A display module, comprising: a display panel, the backlight module according to claim 1, and a front frame, wherein a foam with an adhesive layer on one side is provided between the display panel and the middle frame, the adhesive layer is provided between the foam and the middle frame, and the front frame and the display panel are fixed through the adhesive layer.

14. The display module according to claim 13, wherein the front frame is provided with a second snap-hole, and the side wall of the middle frame is provided with a third snap-fastener that projects towards a direction away from the light guide plate and fits with the second snap-hole.

15. The display module according to claim 14, wherein the third snap-fastener is formed by a portion of the side wall being recessed towards a direction away from the light guide plate, and comprises a third portion connected to the side wall and a fourth portion connected to the third portion, the fourth portion is arranged in parallel with a side plate of the front frame, and the fourth portion is accommodated in the second snap-hole.

16. The display module according to claim 15, wherein a side surface of the fourth portion away from the light guide plate is aligned with a side surface of the side plate of the front frame away from the light guide plate.

17. The display module according to claim 14, wherein a plurality of third snap-fastener are spaced apart on the side wall along an extension direction of the side wall, and at least one of the first snap-fasteners is provided between two adjacent of the third snap-fasteners.

* * * * *